H. Mengel.
Measuring & Laying out Garments
No 77704   Patented May 5, 1868.
2 Sheets
Sheet 1.
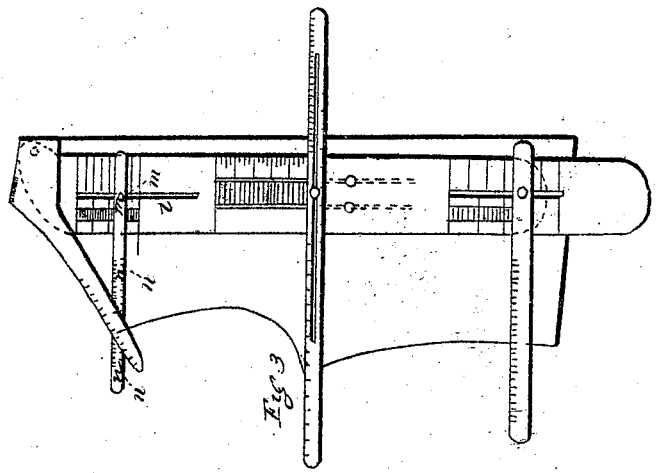
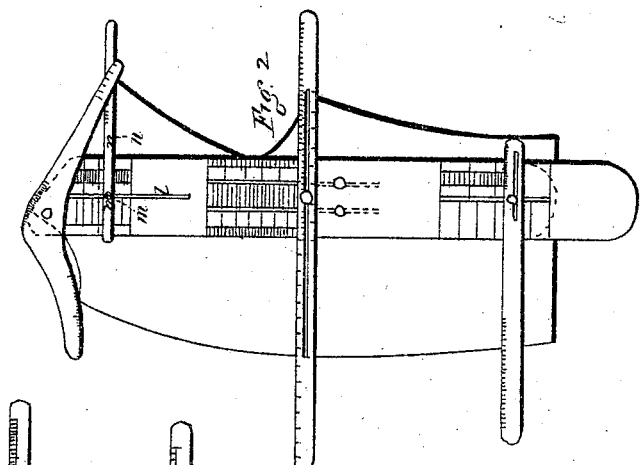
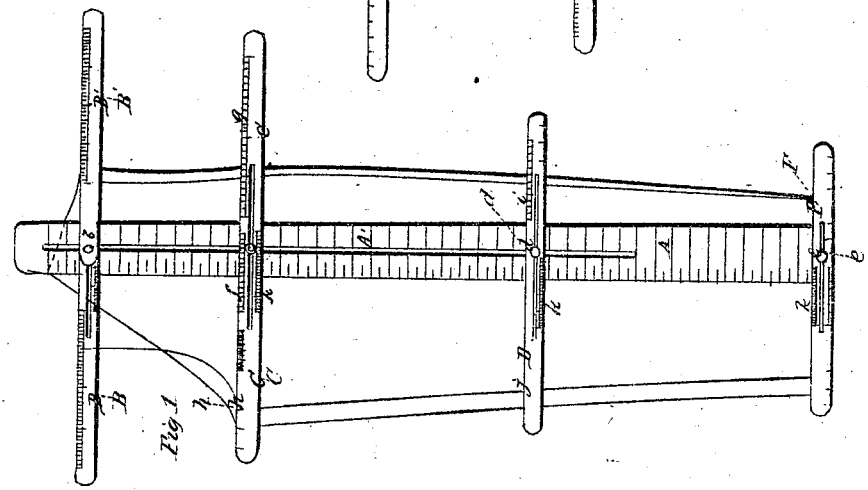
Witnesses:
Jacob J. Henry
Louis Moohay
Inventor:
Herman Mengel
by Wiedersheim & Co
his Attys H. Mengel.
Measuring & Laying out Garments.
Nº 77704. Patented May 5, 1868.
2 Sheets
Sheet 2.
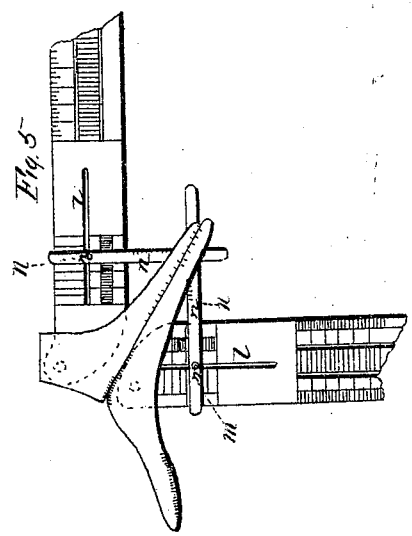
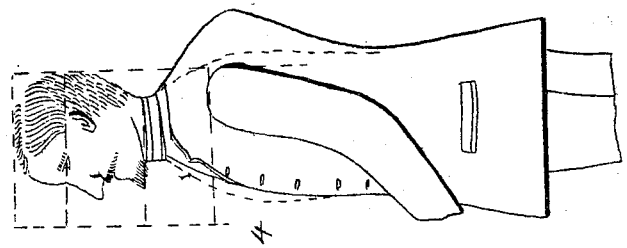

United States Patent Office.

HERMAN MENGEL, OF PHILADELPHIA, PENNSYLVANIA.

Letters Patent No. 77,704, dated May 5, 1868.

---

INSTRUMENT FOR MEASURING AND LAYING OUT GARMENTS.

---

The Schedule referred to in these Letters Patent and making part of the same.

---

TO ALL WHOM IT MAY CONCERN:

Be it known that I, HERMAN MENGEL, of the city and county of Philadelphia, in the State of Pennsylvania, have invented a new and useful Improvement in Instruments for Laying Out on Cloth Measures for Garments to be Cut; and I do hereby declare the following to be a full and correct description of the same, sufficient to enable others skilled in the art to which my invention appertains to fully understand and use the same, reference being had to the accompanying drawings, which make part of this specification, and in which—

Figure 1 represents the instrument for pantaloons, and the manner of laying the measure for the latter out on cloth.

Figures 2 and 3 represent the instruments for laying out the measure of half the front and half the back, respectively, of either coat or vest.

Figure 4 is an illustration of the principle of my method of laying out measures of garments on cloth; and Figure 5 illustrates the method of laying out the height of the shoulders by means of the instruments shown in figs. 2 and 3.

Like letters of reference indicate like parts in the several figures.

All the different instruments patented, until now, for the purpose of laying out on cloth measures for garments to be cut can only be used and adjusted for the regular sizes of clothing, as now used in the manufacture of what is called "ready-made clothing," and which sizes are calculated to fit any well-shaped and well-proportioned person; but these instruments cannot be used for misshaped or deformed persons.

My instruments are constructed according to scientific principles, and by means of them I can fit persons, of any shape, no matter how deformed they may be, and am enabled to lay out on cloth the measures for garments for such persons rapidly, and in a manner to positively necessitate a good fit.

A tailor has often great trouble with his customer, who may be a well-proportioned man, but may have high or low shoulders, or a prominent or no breast at all, and often finds that the coat or vest is too high under the arms or across the shoulders, or bags in front or on the back, when the tailor has faithfully laid out the measure he took from the person, but could not make allowance for the high or low shoulders, &c.

My instruments will, in laying out on cloth measures, indicate any variation from the regular proportion of the man, and thus enable me to fit any shaped or misshaped one.

A, in fig. 1, represents the main rod or piece, which is slotted from near the top to about three-fourths of its length, which slot serves as a way to pins $b$ $c$ $d$, which hold the cross-pieces B, B', C, and D. The upper cross-piece consists of two parts, B B', the former of which has a short slot near its inner end, while the latter is securely fastened to the pin $b$, so that both pieces B B' can be slid up and down on the piece A, and the piece B can, besides, be adjusted laterally. These cross-pieces are provided with scales, of corresponding length, on their upper edges, while the piece B has a smaller scale on its lower edge, near the inner end.

The second cross-piece, C, is provided with a slot, and thus made adjustable, vertically and laterally, to the piece A, on the pin $c$. It is provided with several scales on its top and on its bottom edge.

The third cross-piece, D, is similar to the cross-piece C, only it is not so long as the same.

A fourth cross-piece, E, smaller but similar to the pieces C D, is adjustable only laterally on the pin $e$, which latter is fastened on the lower end of the piece A.

The pieces B B' indicate and are moved up to the degree of the scale on piece A, which indicates the measure from the sole of the foot to the waist, the numbers on scale A running from the bottom to the top. B B' indicate the measure around the waist, and B is used for laying out the fore part and B' the hind part of pantaloons, as indicated in the drawings.

Scale C is moved to the degree on A, indicating the measure from the sole of the foot to the crotch, whatever it may be, and adjusted laterally to the thigh-measure.

Scale D is moved to the degree on A, indicating the measure from the sole of the foot to the knee, and adjusted laterally to the measure around the same.

In laying out a pair of pantaloons on cloth, the regular measures are first taken, and then the instrument is laid flat on the same, and scales B B' adjusted on scale A to the degree indicating the measure from the sole of the foot to the waist. The measure around the waist is then laid out in the following manner:

Supposing the measure to be 32, and the fore part of the pantaloons being to lay out, the figure 32 on scale B indicates the starting-point from which the front line is drawn. The small scale on B indicates the seat-measure, and, by making the number of degrees of this seat-measure on this small scale agree with the edge of piece A, the tightness of the pantaloons on the hips is secured.

The thigh-measure is laid off on the cloth, by means of the piece C, in the following manner:

On the scale $f$ are numbers, indicating the thigh-measure, and the piece C is moved laterally, until the number indicating the measure is even with the left edge of the piece A. On scale $g$ are numbers, indicating the measure around the seat, and the line on the cloth passes through a point where the number of the real measure is on the scale, $h$, on the scale, being the starting-point always on the other side.

On piece D, scale $i$ is numbered according to the knee-measure, $j$ being the starting-point on one side, and the number on scale $i$, corresponding with the measure, being the point through which the line passes on the opposite side, the height of the knee being gained by moving the piece D up to the number on A indicating it.

The piece E gives the measure around the ankle and foot, and operates similarly.

The pieces C D E each have a small scale, $k$, which serves to make the lower parts of the pants to correspond with the upper ones, or, rather, enables the cutter to give the garment the proper shape. The scale $k$ on piece C is properly calculated, and the scales $k$ on pieces D and E are moved to correspond with that on piece C, so that, whatever position the scale $k$ may have to take when the measure is laid off on scale $f$, the scales $k$ on pieces D and E are moved to the same position in relation to piece A, which determines the fixed points on the left ends of the pieces D and E.

The hind part of the pantaloons is laid out in a similar manner, the piece B' coming in play instead of the piece B.

In figs. 2 and 3, my improvements in measures for coats, vests, and other upper garments, are shown. The instruments are substantially the same as those shown in my patent, dated January 22, 1867, but in the upper portion of the instruments are slots $l$, which serve as ways for buttons $m$, to which are rigidly secured pieces $n$. These pieces $n$ serve to indicate the width of the back, and height of the shoulder, in laying out garments.

Having thus described my invention, what I claim as new, and desire to secure by Letters Patent, is—

In combination with an instrument having laterally and vertically-adjustable scales B B' C D E, the scales $n$, vertically adjustable in the instrument, for laying out, on cloth or other fabric, measures for upper garments, operating substantially as described.

To the above I have signed my name, this sixteenth day of April, 1868.

HERMAN MENGEL.

Witnesses:
    JACOB F. HENRY,
    DANIEL HARTSOCK.